F. F. MEEKER.
CULTIVATOR.
APPLICATION FILED DEC. 4, 1913.
1,111,967.
Patented Sept. 29, 1914.
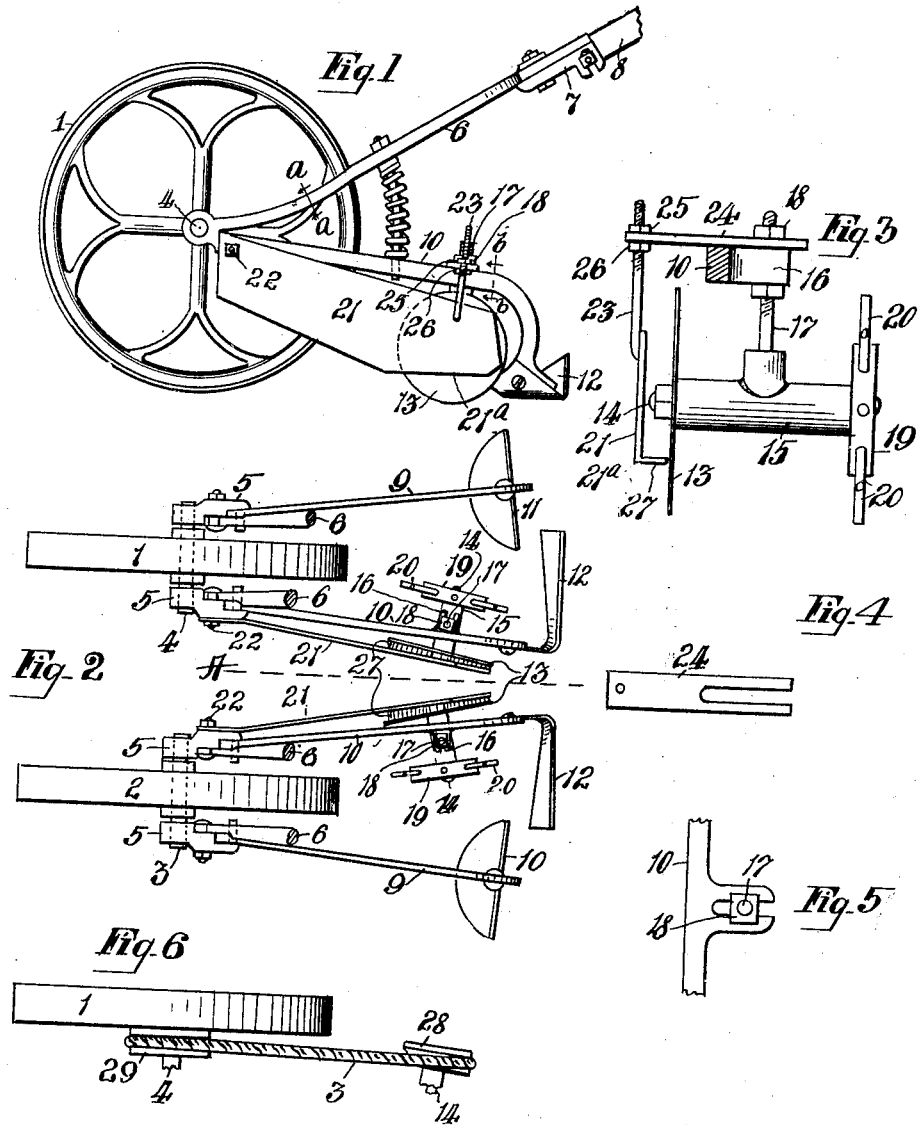

UNITED STATES PATENT OFFICE.

FREDERICK F. MEEKER, OF WESTPORT, CONNECTICUT.

CULTIVATOR.

1,111,967.

Specification of Letters Patent. Patented Sept. 29, 1914.

Application filed December 4, 1913. Serial No. 804,586.

*To all whom it may concern:*

Be it known that I, FREDERICK F. MEEKER, citizen of the United States, residing at Westport, in the county of Fairfield and State of Connecticut, have invented certain new and useful Improvements in Cultivators; and I do hereby declare the following to be a full, clear, and exact description of the invention, such as will enable others skilled in the art to which it appertains, to make and use the same.

My invention relates to an improvement in cultivators, and it consists in certain details of construction to be more fully set forth in the following specification.

Referring to the drawings wherein the same figures indicate like parts throughout the several views: Figure 1 represents a side of one-half of a hand cultivator showing my attachment connected therewith, also broken view of the wooden propelling handle; Fig. 2 is an upper plan view of a hand cultivator showing all but the adjustable feature of the attachment, broken sectional view of the metal propelling arms on line *a—a* of Fig. 1; Fig. 3 is an enlarged rear elevation of my attachment connected to one of the cultivator arms and a sectional view of said arm through line *b—b* of Fig. 1; Fig. 4 is an enlarged plan view of one of the parts of the attachment; Fig. 5 is an enlarged broken upper plan view of one of the cultivator arms adapted to support the attachment; and Fig. 6 is a view showing a belt for driving the disk or weeder wheel.

The hand cultivator illustrated in the drawings is of the usual double construction comprising the traction wheels 1 and 2 secured to the shafts 3 and 4, journaled in the blocks 5. 6 are pairs of arms attached to these blocks, each pair united at the rear of the wheels and connected by the cross bar 7 to which the handle 8 is secured. Arms 9 and 10 are also secured by their inner ends to said blocks, while their outer ends carry the usual hoes 11 and 12.

As the attachment on both halves of the cultivator are exactly alike, the same figures of reference will answer for both.

13 is a thin metal disk or cultivator wheel secured to the shaft 14 journaled in the bearing 15 suspended from the forked lug 16 by means of the stud 17 which has a lateral adjustment in said lug and is secured thereto by the nut 18. The propeller wheel for rotating the cultivator wheel—by its contact with the ground—comprises the hub 19 having the radially disposed spokes 20.

21 is a leveling guard located outside of the cultivator wheel and is secured by its inner end to the bolt 22 while its outer end is adjustably supported to the arm 10 as follows: 23 is a bolt secured to the guard 21 and projecting up through the forked adjusting plate 24 secured to the arm by the nut 18. The height of the guard is adjusted and secured in its adjusted positions by means of the nuts 25, 26. The lower offset edge or foot 27 of the guard normally lies close to the cultivator wheel to prevent stones being carried up by said wheel.

In operating the device, the cultivator wheels are set at the proper angle with respect to the row of vegetables to be cultivated—represented by dotted line A—so as to thoroughly pulverize the ground, and by their angular position throw the pulverized soil toward the row, the foot 27 of the guard acting as a preventive against too much soil being thrown toward the row which might otherwise cover up small vegetables, and at the same time throwing the surplus dirt away from the row. This foot also prevents the cultivator tearing up too much soil and thus disturb the set of the young plants. The offset or foot 27 is not an indispensable feature in leveling off the soil, as the lower horizontal edge $21^a$—Fig. 1—of the guard would serve the same purpose equally well, but this foot, as before mentioned, serves to prevent stones being lifted by the cultivator wheels and thrown toward the row.

The large traction wheels 1 and 2 propel the cultivator, and the disk cultivator wheels are independently rotated, as before mentioned, by the grip of the spokes 20 with the ground. The forward movement of the large traction wheels will naturally propel the spoke traction wheels and rotate the embedded cultivator wheels. It is essential that the cultivator wheels be set at an angle to the row, as otherwise their use would be worthless for the purpose required.

In place of the spoke traction wheels being used to rotate the thin cultivator disk wheels, the pulley 28—Fig. 6—could be mounted on the shafts 14, and a similar pulley 29 mounted on the hub portion of the large traction wheels and the cultivator wheels driven by the belt 30.

While I show the attachment applied to a hand operated cultivator, it will be understood that it can be applied to larger cultivators operated other than by hand adapted to cultivate between rows of growing plants.

Having thus described my invention, what I claim is:—

1. An improvement in cultivators comprising a disk cultivator wheel, a rotatable support therefor, said wheel arranged at an angle with respect to the line of travel of the cultivator, means for rotating the wheel and a guard adjacent to the wheel for the purpose described.

2. An improvement in cultivators comprising a disk cultivator wheel, a shaft on which the wheel is mounted, a support in which the shaft is journaled, means for effecting both a horizontal and vertical adjustment of said support, means for rotating the wheel, a soil leveling guard adjacent to the wheel, and means for effecting a lateral and vertical adjustment of the guard.

3. An improvement in cultivators comprising a disk cultivator wheel, a shaft on which the wheel is mounted, an adjustable support in which the shaft is journaled, a driver on said shaft adapted to contact with the ground when the cultivator is in motion to rotate the disk wheel, and an adjustable guard adjacent to the wheel for the purpose set forth.

In testimony whereof I affix my signature in presence of two witnesses.

FREDERICK F. MEEKER.

Witnesses:
 JAMES FEELEY,
 H. A. LAMB.

Copies of this patent may be obtained for five cents each, by addressing the "Commissioner of Patents, Washington, D. C."